United States Patent [19]

Harris et al.

[11] Patent Number: 5,424,261

[45] Date of Patent: Jun. 13, 1995

[54] LOW TEMPERATURE SINTERING ROUTE FOR ALUMINUM NITRIDE CERAMICS

[75] Inventors: Jonathan H. Harris, Pepper Pike, Ohio; Subhash L. Shinde, Croton-on-Hudson, N.Y.; Takeshi Takamori, Mahopac, N.Y.; Robert A. Youngman, Newbury, Ohio

[73] Assignees: The Carborundum Company, Niagara Falls; IBM Corporation, Armonk, both of N.Y.

[21] Appl. No.: 172,032

[22] Filed: Dec. 22, 1993

[51] Int. Cl.[6] ............................................. C04B 35/581
[52] U.S. Cl. ........................................ 501/96; 501/98; 501/153; 428/901; 428/698; 428/704
[58] Field of Search ........................... 501/96, 98, 153; 428/901, 698, 704

[56] References Cited

U.S. PATENT DOCUMENTS

| | | | |
|---|---|---|---|
| 4,478,785 | 10/1984 | Huseby et al. | 264/65 |
| 4,520,116 | 5/1985 | Gentilman et al. | 501/98 |
| 4,533,645 | 8/1985 | Huseby et al. | 501/96 |
| 4,540,673 | 9/1985 | Takeda et al. | 501/96 |
| 4,547,471 | 10/1985 | Huseby et al. | 501/98 |
| 4,569,922 | 2/1986 | Suzuki | 501/89 |
| 4,578,232 | 3/1986 | Huseby et al. | 264/65 |
| 4,578,233 | 3/1986 | Huseby et al. | 264/65 |
| 4,578,234 | 3/1986 | Huseby et al. | 264/65 |
| 4,578,364 | 3/1986 | Huseby et al. | 501/98 |
| 4,578,365 | 3/1986 | Huseby et al. | 501/98 |
| 4,591,537 | 5/1986 | Aldinger et al. | 428/698 |
| 4,615,863 | 1/1986 | Inoue et al. | 419/23 |
| 4,618,592 | 10/1986 | Kuramoto et al. | 501/96 |
| 4,627,815 | 12/1986 | Aldinger et al. | 432/24 |
| 4,642,298 | 2/1987 | Kuramoto et al. | 501/96 |
| 4,659,611 | 4/1987 | Iwase et al. | 428/209 |
| 4,672,046 | 6/1987 | Sawamura et al. | 501/98 |

(List continue on next page.)

FOREIGN PATENT DOCUMENTS

| | | |
|---|---|---|
| 62176961 | 8/1987 | Japan . |
| 3218977 | 1/1990 | Japan . |
| 2275769 | 11/1990 | Japan . |

OTHER PUBLICATIONS

Sainz de Baranda, Pedro et al, "Effect of CaO on the Thermal Conductivity of Aluminum Nitride" *J. Am. Ceram Soc.*, vol. 76 No. 7, pp. 1751–1760 (1993), no month.

Udalov, Y. P. et al, "The Al2O3—CaO—Y2O3 System" *Russian Journal of Inorganic Chemistry*, vol. 24, No. 10, pp. 1549–1552 1979, no month.

Kurokawa et al, *Development and Microstructural Characterization of High-Thermal Conductivity Aluminum Nitride Ceramics*, Journal Americal Ceramic Society, 1988, pp. 588–594 no month.

Troczynski et al, *Effect of Additives on the Pressureless Sintering of Aluminum Nitride between 1500° and 1800° C.*, Journal of American Ceramic Society (1989) pp. 1488–1491, no month.

Yesaf et al, Development of Aluminum Nitride Ceramics by Pressureless Sintering, pp. 1–11, no date.

Cannell et al, *Processing of Electronic Ceramics*, Advanced Ceramic Processing and Technology, pp. 95–121, 1993 no month.

Bernard Schwartz, *Multilayer Ceramics*, Materials Research Symposium Proc., vol. 40, (1985 Materials Research Society) pp. 49–59 no month.

*Primary Examiner*—Mark L. Bell
*Assistant Examiner*—C. M. Bonner
*Attorney, Agent, or Firm*—Renner, Kenner, Greive, Bobak, Taylor & Weber

[57] ABSTRACT

An aluminum nitride ceramic having desired properties suitable for electronic packaging applications can be prepared from a novel aluminum nitride powder/sintering aid mixture. The sintering aid comprises a glassy component formed from alumina, calcia and boria, and a non-vitreous component comprising an element or compound of a metal of Group IIa, IIIa, or the lanthanides, preferably crystalline oxides, reactible with the crystallized glass component and the alumina from the AlN grains. Alternatively, the sintering aid comprises a multi-component glass composition capable of forming the above components upon melting and thereafter crystallizing upon reaction.

67 Claims, 2 Drawing Sheets

U.S. PATENT DOCUMENTS

| | | | |
|---|---|---|---|
| 4,678,683 | 7/1987 | Pasco et al. | 427/123 |
| 4,720,362 | 1/1988 | Gentilman et al. | 264/1.2 |
| 4,746,637 | 5/1988 | Kasori et al. | 501/98 |
| 4,764,321 | 8/1988 | Huseby et al. | 264/65 |
| 4,766,097 | 8/1988 | Shinozaki et al. | 501/98 |
| 4,786,448 | 11/1988 | Fukuhara et al. | 264/65 |
| 4,810,679 | 3/1989 | Dole et al. | 501/98 |
| 4,818,455 | 4/1989 | Huseby et al. | 264/65 |
| 4,843,042 | 6/1989 | Dole et al. | 501/96 |
| 4,877,760 | 10/1989 | Okuno et al. | 501/98 |
| 4,883,780 | 11/1989 | Kasori et al. | 501/96 |
| 4,897,372 | 1/1990 | Huseby et al. | 501/96 |
| 4,950,435 | 8/1990 | Taniguchi et al. | 264/65 |
| 4,960,734 | 10/1990 | Kanai et al. | 501/98 |
| 5,063,183 | 11/1991 | Taniguchi et al. | 501/96 |
| 5,073,526 | 12/1991 | Enloe et al. | 501/96 |
| 5,077,245 | 12/1991 | Miyahara | 501/96 |
| 5,147,832 | 9/1992 | Shimoda et al. | 501/96 |
| 5,154,863 | 10/1992 | Miyahara et al. | 501/96 |
| 5,165,983 | 11/1992 | Sugiura et al. | 428/141 |
| 5,214,005 | 5/1993 | Yamakawa et al. | 501/96 |
| 5,250,478 | 10/1993 | Ishida et al. | 501/98 |

LOW TEMPERATURE SINTERING ROUTE FOR ALUMINUM NITRIDE CERAMICS

FIELD OF THE INVENTION

The present invention is directed to ceramic bodies having electronic characteristics suitable for use as substrates for electronic packaging applications. More particularly, the invention is directed to sintered aluminum nitride substrates exhibiting high density and high thermal conductivity, prepared by a low temperature pressureless sintering process compatible with metal ceramic laminate processing temperature regimes. These sintered aluminum nitride substrates are particularly useful for multilayer metal-ceramic based microelectronic packages.

BACKGROUND

As compared to alumina, the commercially predominant electronic ceramic, aluminum nitride ceramics potentially possess superior characteristics for electronic packaging applications with respect to electronic insulation, high thermal conductivity (above 120 W/m-K), thermal expansion match to silicon devices, and low dielectric constant. Aluminum nitride substrates are potentially useful where high heat dissipation is required in a microelectronic package, such as in a multilayer metal-ceramic package for high power devices. Aluminum nitride ceramics for microelectronic applications must therefore be capable of accommodating metallized components, polymeric layers and heat generating, high power electronic devices.

Prepared from aluminum nitride powders, in order to achieve suitable properties the ceramic must achieve a certain density, at least about 90%, preferably greater than or equal to about 95%, of theoretical. Aluminum nitride with no sintering additives decomposes below the temperature required to sinter it to maximum density. However, densification can be achieved at lower temperatures by the use of sintering aids.

Sintering aids liquify at temperatures below the decomposition and pure compound sintering temperatures for the ceramic, and promote densification of the ceramic grains by i) a particle rearrangement process mediated by capillary forces between the wetting liquid and the solid particles, and thereafter, ii) a dissolution and precipitation process. In this process, solid is preferentially dissolved at regions of high curvature (small particles) and redeposited at regions of low curvature (large particles). In addition, solid is preferentially dissolved at regions of solid-solid contact and redeposited away from the contact areas. At the later stages of the liquid sintering cycle, microstructure is refined via grain growth and coalescence processes.

Different combinations of sintering aids provide various compounds in situ which melt at different temperatures. The temperatures at which sintering occurs has an effect on the progress of the different types of sintering processes, and thus the microstructure and the final properties of the sintered ceramic body. Sintering aids also function to increase thermal conductivity of the sintered aluminum nitride body by gettering oxygen from the aluminum nitride powder. Thus, an effective sintering additive must form a liquid at low temperature capable of dissolving and reprecipitating aluminum nitride without oxidation of the aluminum nitride. Not every liquid at sintering temperature will be able to getter oxygen and densify the ceramic.

All commercially available aluminum nitride powders contain oxygen as an impurity. This oxygen primarily takes two forms in the powder, as an alumina coating on each of the powder particles, and as dissolved oxygen impurity within the crystalline lattice of the aluminum nitride particles. A minor amount will be tied up as an oxide of any metal impurities which may be present. At a given sintering temperature, only a certain amount of oxygen, primarily from surface alumina and secondarily from other sources, will be available for reaction (hereinafter "available oxygen").

Upon densification, the volume of the green body, and for multilayer structures the volume of the metal lamina contained in the green body, together with the linear dimensions of the body, decrease as a function of both the temperature experienced and the particular material involved. If the metal and ceramic shrink at different times and rates, this shrinkage mismatch leads to residual stresses between the different constituent materials in the sintered body and distorts the final shape of the body. In order to maintain the exacting geometric tolerances required by the electronic packaging industry for multilayer ceramic based packages, it is necessary that the ceramic and the metal sinter at approximately the same rate.

Thus it is desirable to facilitate efficient sintering of aluminum nitride at particularly low temperatures to mediate the problems associated with different sintering rates and thermal expansion mismatches between the ceramic and metal portions of a multilayer electronic package.

The use of lower sintering temperatures by the art, however, has generally resulted in properties degrading from the desired theoretical levels. This may result from the failure of the sintering aids to either form an effective sintering liquid needed to densify the ceramic or to remove dissolved oxygen from the AlN lattice, and/or from the formation of an additional phase or additional phases within the AlN structure which comprise reaction products of the sintering aid(s), aluminum and oxygen.

Sintering aids for AlN which have been disclosed in the art include Group IIa, Group IIIa, and/or rare earth compounds, including calcia and yttria, among others. Resulting AlN sintered bodies are disclosed to contain alkaline earth-aluminates, Group IIIa-aluminates, rare earth-aluminates, and AlON.

U.S. Pat. No. 4,618,592 discloses the use of sintering aids for aluminum nitride which are at least one metal element selected from alkaline earth metals, lanthanum group metals and yttrium or a compound thereof.

U.S. Pat. No. 4,746,637 discloses sintering aluminum nitride powder in mixture with a rare earth compound and an alkaline earth metal compound. U.S. Pat. No. 5,077,245 discloses sintering aluminum nitride using as sintering aids at least one metal or compound of a Group IIa metal such as Ca and at least one metal or compound of a Group IIIa metal such as Y and rare earth compounds. Mixed oxides of Group IIa/IIIa metals and alumina were identified in aluminum nitride sintered with these sintered aids. In Sainz De Baranda, Pedro, "The Effect of Calcia and Silica on the Thermal Conductivity of Aluminum Nitride Ceramics", a doctoral dissertation, Rutgers University, (Vol. 52/07-B of Dissertation Abstracts International, p 3846.), two ternary oxide second phase compounds were identified in aluminum nitride bodies sintered using yttria and calcia (calcium nitrate) sintering aids, namely CaYAlO$_5$ and CaYAl$_3$O$_7$.

U.S. Pat. No. 5,165,983 discloses a method to sinter a plurality of AlN plates containing oxides of aluminum, rare earth, and Group IIIa metal elements superposed on a ceramic support base with a ceramic powder interposed between the base and the plate and between the plates.

Japanese Kokai J02-275,769 discloses additions of aluminum, calcia and boria to aluminum nitride powder, followed by sintering at 1400-2000 degrees Centigrade. However, to achieve a fully dense body having a thermal conductivity of 192 W/m-K, the compositions were sintered at 1800 degrees Centigrade for 4 hours.

Japanese Kokai J62-176,961 discloses additions of alumina, calcia and boria (as well as others) to aluminum nitride to achieve a sintered body with improved density and thermal conductivity. Boria, however, melts at about 450 degrees Centigrade which presents difficulties in electronic packaging applications. For example, it is necessary to remove substantially all residual carbon from substrates that are used in electronic applications. The low melting boria hinders this so-called binder burnoff process.

Japanese Kokai J03-218,977 discloses the addition of 0.1-10 weight percent of a glass powder sintering aid to the aluminum nitride powder prior to sintering. The glass powder consists of 0-38 mole % alumina, 30-80 mole % boria and 20-56 mole % calcia. In weight percent, it is 0-28 weight % alumina, 27-77 weight % boria and 23-64 weight % calcia. The aluminum nitride body is sintered at a temperature greater than 1650 degrees Centigrade which is undesirably high. The resulting aluminum nitride samples have a maximum thermal conductivity of 110 W/m-K which, while better than alumina, is considerably less than pure aluminum nitride. Further, the majority of samples had a thermal conductivity of 100 W/m-K or less.

It is an object of the present invention to produce an aluminum nitride body that is fully dense and highly thermally conductive by sintering at a lower sintering temperature than has heretofore been feasible and which will allow the production of the aluminum nitride body at a reduced cost.

It is another object of the present invention to produce an aluminum nitride body that is fully dense and highly thermally conductive, by sintering at a temperature which is compatible with metal-ceramic laminate processing.

These and other purposes of the present invention will become more apparent after referring to the following detailed description of the invention.

SUMMARY OF THE INVENTION

An aluminum nitride ceramic having desired properties suitable for electronic packaging applications can be prepared from a novel aluminum nitride powder/sintering aid presintering mixture. The sintering aid comprises a glassy component formed from alumina, calcia and boria, and an additional non-vitreous component comprising an element, compound or preferably a crystalline metal oxide, of a metal selected from Group IIa, IIIa, or the lanthanides, reactible with the crystallized glass component and alumina from the aluminum nitride grains.

Alternatively, the sintering aid comprises a multicomponent glass composition capable of forming the above components upon melting and thereafter crystallizing upon reaction. In this alternative embodiment, optionally an additional non-vitreous component described above is added to the presintering mixture.

Therefore, a presintering aluminum nitride powder/sintering aid mixture is provided wherein the aluminum nitride contains alumina and wherein the sintering aid comprises a) an element or compound of a metal selected from the group consisting of Group IIa, IIIa, lanthanide metals and mixtures thereof, and b) a glassy component formed from alumina, calcia, and boria, said metal element or compound being reactible with the glassy component and the alumina from the aluminum nitride.

A low temperature process is provided for producing sintered aluminum nitride bodies comprising ramping the temperature of a presintering mixture in a sintering atmosphere to a sintering temperature between about 1550° C. to about 1700° C. and holding said sintering temperature for an effective period of time to achieve aluminum nitride density of greater than about 95% of theoretical and thermal conductivity greater than about 120 W/mK.

A sintered aluminum nitride body is provided having low camber, high dimensional stability, at least 95% theoretical density and a thermal conductivity of at least 120 W/m-K comprising aluminum nitride and a second phase containing YAlO$_3$ (YAP) and CaYAl$_3$O$_7$ having substitutional boron contained within the second phase ternary metal oxide. These characteristics are also observed in co-fired multilayer AlN sintered bodies, having multiple alternating layers of metal and ceramic.

A sintering system for aluminum nitride bodies is provided, to achieve high density and high thermal conductivity, having a controlled sintering atmosphere containing at temperatures above 1200° C. boria vapor, and at temperatures above 1500° C. a partial pressure of the liquid glassy component. Low camber is achieved in the above system by applying weight to the aluminum nitride bodies during sintering in the controlled atmosphere.

Aluminum nitride sintered bodies having enhanced properties can be obtained using the novel sintering aid package within the sintering system even at a low maximum sintering temperature, such as 1550° C.-1700° C. Thermal conductivities observed in AlN bodies sintered at 1600° C. to 1625° C. maximum range from 126-190 W/m-K as measured by the laser flash technique.

DETAILED DESCRIPTION

The formation of polycrystalline aluminum nitride sintered bodies having the density, camber and dimensional control, electrical resistivity, thermal conductivity, thermal expansion match with silicon and dielectric properties required for electronic packaging applications has been achieved by pressureless sintering of an aluminum nitride powder containing mixture at low sintering temperatures, namely 1550°-1700° C. This temperature regime is suitable for the simultaneous sintering of multiple metal and ceramic layers known in the art as co-fired multilayer electronic packages.

Components of the mixture which are sintered to form the polycrystalline body include aluminum nitride powder, preferably having a low oxygen content (such as F-grade sold by Tokuyama Soda, although H-grade and Dow Chemical grades 44 and 48 are also suitable), a conventional binder such as polyvinylbutyral (PVB), ethyl cellulose or polymethyl methacrylate, and the novel sintering aid package.

In one embodiment, the sintering aid comprises at least two components, a glassy component and at least one metal element or compound, preferably a crystalline metal oxide or a compound convertible to a crystalline metal oxide, of Group IIa, IIIa, or the rare earth metals (lanthanides).

The glassy component is formed by rapid quenching, such as splat quenching between steel plates or by roller quenching between cooled drums, of a melt of the constituent components. These components include alumina, calcia and boria. Preferred are glass compositions of calcia-alumina-boria in compositional ranges that will form glasses using conventional rapid-quench techniques. An example is a glass formed by splat quenching from a melt derived from $CaO/Al_2O_3/B_2O_3$, referred to below as "CAB glass". The glassy component is added to the mixture containing the AlN powder in comminuted, or powder, form.

Suitable CAB glass compositions comprise vitreous compositions formed from a mixture of calcia, alumina, and boria in the proportion of calcia between 40 and 80 weight percent, alumina between 10 and 50 weight percent, and boria between 3 and 25 weight percent. Preferred is an embodiment wherein the components are present in a proportion of calcia between 45 and 65 weight percent, alumina between 20 and 45 weight percent, and boria between 5 and 20 weight percent. Most preferred is an embodiment wherein the components are present in a proportion of calcia between 45 and 55 weight percent, alumina between 30 and 40 weight percent, and boria between 5 and 15 weight percent.

The glassy component is prepared by forming a mixture of the component metal oxides and melting the mixture to form a vitreous solid upon cooling. For the CAB glass components, a suitable melting temperature is about 1450° C. to form a homogeneous liquid. The homogeneous liquid is quenched to form glassy ribbons. The quenched ribbon is pulverized or comminuted to obtain a desired particle size which is suitable for addition to the aluminum nitride powder before sintering, forming in part the novel presintering mixture. A suitable particle size for use as an aluminum nitride sintering aid is about 3 to about 5 microns.

The Group IIa, IIIa, or lanthanide (rare earth) metal compound is preferably a crystalline metal oxide. Alternatively it is a compound convertible to the metal oxide in the sintering environment and which has no constituent which would be deleterious to the properties desired in the sintered AlN body. The crystalline metal oxide must be capable of reacting at a temperature within the sintering regime with crystallized glass components and alumina from the AlN grains to form at least one crystalline phase. An example of a suitable metal oxide of Group IIa is calcia and of Group IIIa is yttria.

Group IIa metals or compounds thereof which can be used as effective sintering aids in the present invention include Ca, Sr, Ba and mixtures thereof. Group IIIa or rare earth metals and compounds thereof which can be used as effective sintering aids in the present invention include Y, La, Ce, Nd, Sm, Eu, Gd, Tb, Dy, Ho, Er, Tm, Yb, Lu, and mixtures thereof. Compounds of the above metals which may function as sintering aids for aluminum nitride according to the present invention include but are not limited to oxides, carbonates, nitrates, sulfates, fluorides and mixtures thereof. The designations of the sub groups of the elements in this specification follow the nomenclature adopted by the International Union of Pure and Applied Chemistry (IUPAC).

Alternatively, the sintering aid package may comprise a multi-component glassy composition derived from a melt containing in addition to alumina, calcia and boria as set out above, a metal oxide selected from the crystalline metal oxides described above. An example is a glass having the constituent elements Ca-Al-B-Y-O. A range of compositions derived from the components $CaO-Al_2O_3-Y_2O_3-B_2O_3$, can be obtained in the vitreous form by quenching. The melting points of the crystallized materials are in the range of about 1200°–1350° C., and therefore are highly suitable as sintering aids for aluminum nitride below 1600° C. In alternative embodiments, alumina in the form of metal oxide is added to the sintering aid/glassy component containing presintering mixture.

Figure 1:
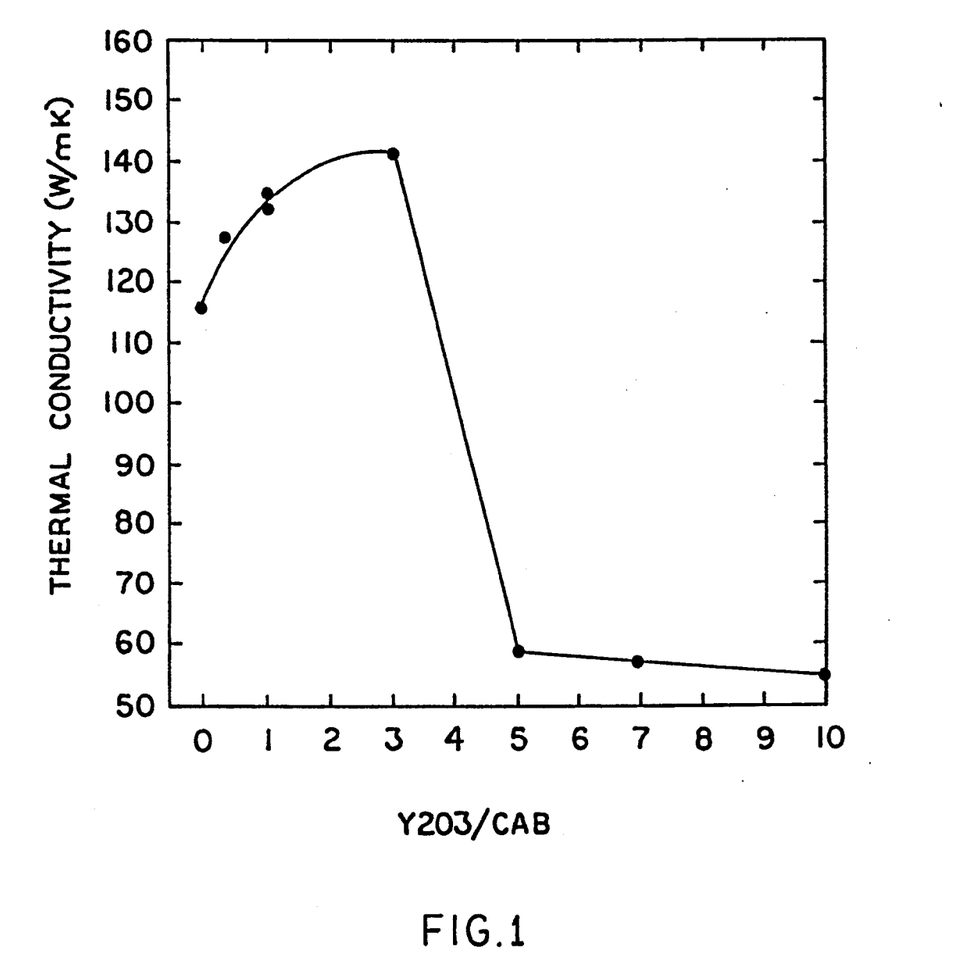
FIG. 1 is a graphical representation of thermal conductivity of sintered aluminum nitride bodies sintered with varying ratios of metal oxide to glassy component as sintering aids.

Further exemplification of the sintering aid package will be represented below by an embodiment which comprises a glassy component having the constituent elements Ca-Al-B-O (CAB glass) and the crystalline metal oxide yttria. The preferred ratio of the crystalline metal oxide to the glassy component is about 1:1 to about 3.5:1, and most preferably is within the range of about 2:1 to about 3:1. For ratios above the stated range, there is a sudden drop in both the density and the thermal conductivity of the resulting sintered AlN product, as is demonstrated for thermal conductivity in FIG. 1. Data represented in FIG. 1 was taken from AlN samples sintered at about 1600° C. for 10 hours in a refractory metal furnace.

The AlN powder, binder and sintering aid package powder are mixed and are formed or shaped into green bodies by conventional procedures, such as dry pressing or sheet casting. To form multilayer ceramic bodies, sheets of AlN green body are printed with a metal paste, such as metal pastes derived from refractory metals such as molybdenum and tungsten, optionally having ceramic additives such as AlN. The printed green sheets are laminated together under heat and pressure prior to sintering to form a structure having multiple alternating layers of metal and ceramic.

Sintering is carried out in a high temperature furnace, for example, a graphite or a refractory metal furnace. The sintering system must be configured to supply an atmosphere which contains an suitable sintering gas for aluminum nitride, such as nitrogen, and at the appropriate temperatures, vapors of various components of the sintering aid package. When a refractory metal furnace is utilized, the sintering atmosphere should additionally contain a gas to protect the furnace elements, such as hydrogen.

The sintering process is begun with a ramping of the temperature from the ambient to the desired sintering temperature at which the AlN is held for a period of time effective to complete densification and oxygen gettering. It is unnecessary to utilize a separate binder burnout step when using the above sintering aid package. Binder burnout can be accomplished in situ within the sintering furnace.

At a temperature of about 800°–900° C. the glassy component becomes a highly viscous flowable solid and viscous sintering of the ceramic commences. A slight densification occurs, as is depicted by the negative "expansion" or contraction shown in the dilatometry trace of FIG. 2. As temperature is increased between about 900°–1200° C., the glass begins to crystallize.

Figure 2:
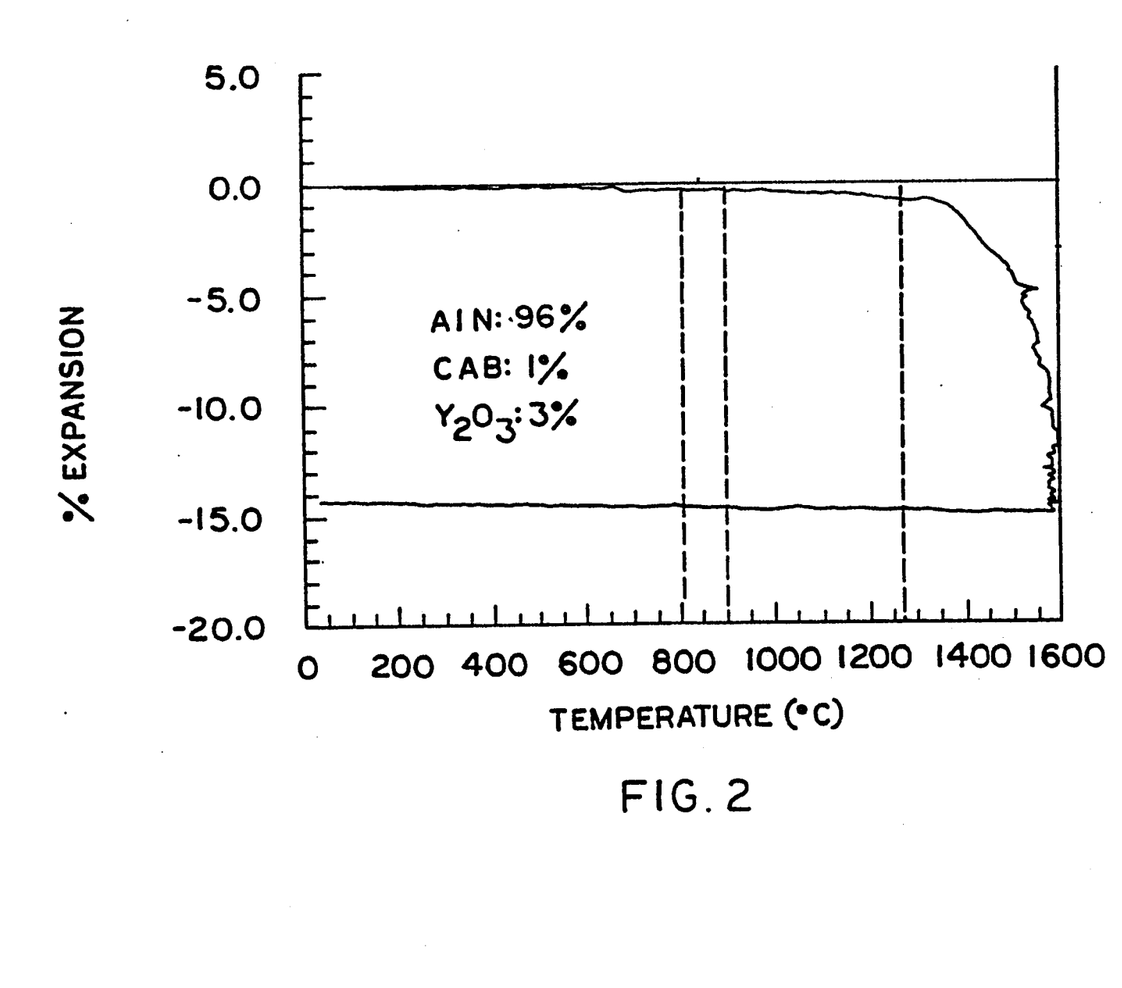
FIG. 2 is a graphical representation of the change in density during sintering of an aluminum nitride body.

At above a temperature of about 1200° C. the crystallized glass melts. At this liquid phase-assisted sintering regime further densification occurs and reaction begins to take place with oxygen from the low temperature sintering phase, the AlN grains and the crystalline oxide to prevent oxygen from entering the AlN lattice, to provide high thermal conductivity in the final product, and to form a crystalline phase. In this area of the temperature regime it is necessary, in order to provide effective and uniform sintering, that a boron oxide vapor component be maintained in the furnace atmosphere in the vicinity of the AlN part so that all the boria present within the body or part does not evaporate away.

At a temperature of about 1500° C. the liquid which is formed from the crystalline phase contains the components Ca-Al-Y-B-O. The temperature is increased to at least about 1550° C.–1700° C., preferably about 1550° C.–1650° C. and more preferably about 1550° C.–1600° C. and held for an effective period of time. At this temperature regime substantial densification occurs as is further defined in FIG. 2. In order to attain the highest percentage of theoretical densification, however, it is necessary to provide a partial pressure of the liquid component in the furnace atmosphere in the vicinity of the AlN part so that an effective amount of the high temperature liquid component remains in the part for a period of time sufficient for final densification to occur.

In addition to introduction of the desired vapor into the sintering furnace or generation in situ by volatilizing the component in the sintering furnace, proper furnace atmosphere can be maintained by performing the sintering operation in a container within the furnace with a specified ratio of "free volume" to parts and carriers within the container volume. The container must be capable of surviving the temperature and reactants experienced in the sintering operation, and must not form reaction products with the ceramic or out-gasses which would be deleterious to the sintered AlN or cofired metal/AlN product or their properties. An acceptable range of free volume for the specific embodiment exemplified below, in which the samples comprised 4 parts by weight of sintering aid to 100 parts of aluminum nitride powder, is preferably about seventy-five percent (75%) or above, and would vary as the amount of sintering aid varies.

The carriers for the AlN parts must not stick to the parts during or after the sintering procedure and must not interfere with the densification of the parts (for example, out-gases must be permitted to escape). The application of weight to the AlN parts during the sintering procedure provides an increased degree of control to minimize the camber of the sintered parts.

SPECIFIC EXAMPLES

Example 1

AlN powder (Tokuyama Soda Grade-F) was mixed with 3 wt. % yttria (based on the AlN weight), 1 wt. % CaO-alumina-$B_2O_3$ glass (50/40/10 by weight) formed by melt quenching, and 8 weight percent PVB binder. This mixture was dried and pressed at 16,000 psi into a 0.25" diameter pellet and sintered in a refractory metal furnace at 1600° C. for 10 hours. The resulting AlN ceramic had a density of greater than 98% of the theoretical value and a thermal conductivity measured by laser flash of 158 W/m-K.

Example 2

The same mixture as in Example 1 was combined with PVB binder and tape cast to produce ceramic green sheets 0.010 inches thick. These sheets were extrusion printed with a tungsten paste (using ethyl cellulose as a binder) to form a metallization layer. Several sheets were then laminated together at 85° C. for 6 minutes at 4000 psi to produce a multilayer ceramic and metal body, and then sintered in a refractory metal furnace at 1600° C. for 5 hours. The resulting multilayer ceramic and metal body had a ceramic density greater than 98% of the theoretical value, metal density greater than 85% of the theoretical value and a thermal conductivity measured by laser flash of 126 W/m-K.

The aluminum nitride sintered bodies prepared according to the above procedures have characteristics and properties desirable for electronic packaging applications. The AlN sintered body has a density greater than 97%, with 99% being typically achieved. The thermal conductivity is generally between 135–143 W/m-K, and values of 190 W/m-K have been observed in parts held at the sintering temperature of 1600° C. for 64 hours. Resistivity and dielectric properties are within acceptable ranges.

The sintered AlN parts have a low camber, and good dimensional control in the X, Y, and Z directions equal to that achieved by sintered alumina. Dimensional (shrinkage) control is achievable even with the application of weight to the sintering part, as the effects of weight on dimensional control are overcome by the effects of the sintering aid package and sintering atmosphere control to achieve "free" sintering conditions.

The second phase present in the sintered AlN body is dependent upon the metal oxide:glassy component ratio, in a preferred embodiment the Y:CAB glass ratio, as well as the sintering temperature and time (atmosphere control being assumed). A preferred second phase is a combination of $CaYAl_3O_7$ with substitutional boron and YAP. Continuation of sintering, even at 1600° C. will deplete the boron substituted ternary metal oxide phase in favor of yttria aluminates, and continued sintering beyond that will result in only yttria being present as a second phase. With milder sintering conditions (time or temperature), calcia-borates, calcia-aluminates and yttria-calcia-aluminates are possibly present in the sintered body.

Analysis of sintered aluminum nitride bodies prepared at low sintering temperatures from aluminum nitride powder and a sintering aid of yttria and CAB glass as described above revealed by transmission electron microscopy (TEM) a uniform distribution of wetted second phase in an AlN matrix. X-ray diffraction (XRD) and energy dispersive x-ray spectroscopy (EDS) identified thin layers of second phase extending along grain boundaries as comprising $CaYAl_3O_7$, with some de-wetted YAP particles also being present. EDS identified YAP as containing a significant amount of calcium (Ca) in solid solution. Secondary ion mass spectrometry (SIMS) identified boron (B) as being present within the CaYAl$_3$O$_7$.

Examples 3–22

Aluminum nitride powder was prepared into green body sheets containing about 3.85 weight percent sintering aid total, including powdered metal oxide and glassy sintering additives in weight proportions as set forth in the Table and 8 weight percent of PVB as a binder. The weight proportion of the CAB components were 50% calcia, 40% alumina, and 10% boria. The green sheets were sintered together in a refractory metal furnace at 1600° C. for 10 hours (ramping at 4° C. per minute to temperature). In examples 3–18, tungsten setters were utilized in the sintering furnace, while in examples 19–22, molybdenum setters were utilized.

A comparison was made of the results obtained in density and thermal conductivity for the AlN bodies sintered with the different additive packages. The preferred presence of the boria component in the vitreous mixture (glassy phase) and the utilization of the glassy component sintering aid resulted in an increase in the thermal conductivity of the final sintered body and generally in a surprising increase in density, as compared to counter examples in which an equal weight proportion of metal oxide (not vitreous) was substituted for the glassy component.

TABLE

| Example | Sintering Aid Composition | Density g/cc | Thermal Conduct. k (W/mK) |
|---|---|---|---|
| 3 | 3Y/1CAB | 3.00 | 134 |
| 4 | 3Y/1CAB | 3.01 | 141 |
| C 5 | 3Y/1CA | 3.12 | 117 |
| C 6 | 3Y/1CA | 3.12 | 125 |
| 7 | 3Y/1CAB/0.7 Al$_2$O$_3$ | 3.13 | 141 |
| 8 | 3Y/1CAB/0.7 Al$_2$O$_3$ | 3.14 | 141 |
| C 9 | 3Y/1CA/0.7 Al$_2$O$_3$ | 3.10 | 140 |
| C 10 | 3Y/1CA/0.7 Al$_2$O$_3$ | 3.10 | 149 |
| 11 | 3Y/1CAB/1.0 Al$_2$O$_3$ | 3.20 | 148 |
| 12 | 3Y/1CAB/1.0 Al$_2$O$_3$ | 3.20 | 151 |
| C 13 | 3Y/1CA/1.0 Al$_2$O$_3$ | 3.14 | 137 |
| C 14 | 3Y/1CA/1.0 Al$_2$O$_3$ | 3.14 | 132 |
| 15 | 3Y/1CAB/1.5 Al$_2$O$_3$ | 3.23 | 145 |
| 16 | 3Y/1CAB/1.5 Al$_2$O$_3$ | 3.23 | 143 |
| C 17 | 3Y/1CA/1.5 Al$_2$O$_3$ | 3.20 | 135 |
| C 18 | 3Y/1CA/1.5 Al$_2$O$_3$ | 3.20 | 139 |
| 19 | 3Y/1CAB | 3.25 | 144 |
| 20 | 3Y/1CAB | 3.25 | 142 |
| C 21 | 3Y/1CA | 3.21 | 138 |
| C 22 | 3Y/1CA | 3.21 | 129 |

CAB = Calcia/Alumina/Boria vitreous powder
CA = Calcia and Alumina (not in vitreous form)
Y = Yttria In the above examples according to the present invention, yttrium oxide was added separately from the glassy components in the crystalline phase, and therefore, it is assumed to have undergone solid state reaction similar to its function in high temperature sintering.

In addition, a Group IIIa/rare earth metal compound such as yttrium oxide can also be added as a component of the vitreous phase, and upon the melting of this phase, which in a preferred embodiment contains yttrium oxide, it will begin working as a sintering aid at a lower temperature. Even though additional yttrium oxide may be added in the crystalline phase to supplement the amount needed for gettering oxygen in the aluminum nitride body to improve the resulting thermal conductivity, it is preferred in this alternative embodiment to have at least part of the yttrium oxide additive (from the glassy component) present in a liquid form at the earliest stage of the sintering reaction to accomplish effective low temperature sintering.

In this embodiment, the vitreous material may be formed by quenching a melt containing yttrium oxide in the proportion of about 10 to greater than 20 weight percent in the CaO-Al$_2$O$_3$-Y$_2$O$_3$ system when the remaining CaO/Al$_2$O$_3$ is present in a proportion of 40/60 percent by weight to 60/40 percent by weight, preferably in a 50/50 percent by weight ratio. Addition of B$_2$O$_3$ in the amount of 5–10 weight percent makes the viscosity of the liquid phase near the sintering temperature very low, and therefore advantageous for the initial stage of the liquid phase sintering of the aluminum nitride. Depending upon sintering conditions, it is possible that B$_2$O$_3$ will leave the system toward the completion of the sintering to reduce the amount of second phase in the sintered body.

Examples 23–24

Sintering additives were prepared by melting oxide components and quenching between steel plates to obtain vitreous materials of the following compositions by weight percent: of CaO/Al$_2$O$_3$/Y$_2$O$_3$/B$_2$O$_3$, in the proportions 40/40/10/10 and 40/30/20/10. In these cases, differential thermogravimetric analysis (DTA) thermograms showed the melting points at 1228° C.–1300° C. All melts were very fluid and suitable for use according to the present invention as set forth above.

For slurry casting of aluminum nitride presintered bodies (green sheets) a mixture is made consisting of ceramic materials (aluminum nitride powder plus the pulverized vitreous mixture), binder, solvent and minor conventional constituents such as plasticizers and antioxidants. The binder may be about 5 to 15 weight percent while the solvent amounts to about 20 to 45 weight percent, the remainder being the ceramic materials. The slurry is cast on to a carrier sheet, which conventionally may be Mylar. Upon drying, the carrier sheet is removed and a tape of the product is produced. The tape is blanked into the desired endshape. One desired endshape is a green sheet for fabricating multilayer ceramic packages.

Multilayer ceramic packages may be fabricated by the following process. A series of green sheets are punched to form "vias" and then a metallic paste is screened onto the green sheets, to form conductive lines, and into the vias to form conductive pathways between the different layers of green sheets. For aluminum nitride products, the preferred metallic pastes contain molybdenum or tungsten. The green sheets are then stacked, laminated and sintered to obtain a multilayer ceramic package. In use, at least one semiconductor device is mounted on the multilayer ceramic package. The multilayer ceramic package is a preferred use of the present invention.

The aluminum nitride body may be sintered in a conventional furnace so long as there is a protective atmosphere. A preferred atmosphere is forming gas which is a mixture of nitrogen and hydrogen gases. A typical sintering schedule can be undertaken as follows. The unsintered aluminum nitride bodies are inserted into a sintering furnace. A protective atmosphere such as dry forming gas (N$_2$+10–20%H$_2$) is used throughout the sintering process. Over a period of about 5 hours, the temperature is ramped up from room temperature to about 600° C. to pyrolyze the binder. Then, over a period of about 8 hours, the temperature is ramped up to the sintering temperature of about 1550°–1700° C., preferably about 1550°–1650° C. and held at the sintering temperature for about 5 hours. Then, over a period of about 5 hours, the temperature is ramped down to room temperature.

For slurry casting, it is preferred that the proportions of the components of the vitreous mixture, in weight percent, are 5–20% boria, 20–45% alumina and 45–65% calcia. For greatest density and thermal conductivity, it is most preferred that the proportions of the components of the vitreous mixture, in weight percent, are 5–15% boria, 30–40% alumina and 45–55% calcia. The metal oxide component is preferably yttria.

Resulting metal-ceramic laminates (for multilayer electronic packages) exhibit high density, high thermal conductivity, and excellent camber and dimensional control.

Thus, the objects of the invention are accomplished by the present invention, which is not limited to the specific embodiments described above, but which includes variations, modifications and equivalent embodiments defined by the following claims.

We claim:

1. A presintering aluminum nitride powder/sintering aid mixture wherein the aluminum nitride contains impurity alumina and wherein the sintering aid comprises a) an element or compound of a metal selected from the group consisting of Group IIa, IIIa, lanthanide metals and mixtures thereof, and b) a glassy component formed from alumina, calcia, and boria, said metal element or compound being reactible with the glassy component and the alumina from the AlN.

2. The presintering mixture as in claim 1 wherein the glassy component is a glass formed by rapid quenching a melt of calcia, alumina and boria.

3. The presintering mixture as in claim 1 wherein the metal element or compound is yttrium or a yttrium compound.

4. The presintering mixture as in claim 3 wherein the yttrium compound is yttria.

5. The presintering mixture as in claim 1 wherein the glassy component comprises a vitreous composition formed from a mixture of calcia, alumina, and boria in a proportion of calcia between about 40 and 80 weight percent, alumina between about 10 and 50 weight percent, and boria between about 3 and 25 weight percent.

6. The presintering mixture as in claim 1 wherein the glassy component comprises a vitreous composition formed from a mixture of calcia, alumina, and boria in a proportion of calcia between about 45 and 65 weight percent, alumina between about 20 and 45 weight percent, and boria between about 5 and 20 weight percent.

7. The presintering mixture as in claim 1 wherein the glassy component comprises a vitreous composition formed from a mixture of calcia, alumina, and boria in a proportion of calcia between about 45 and 55 weight percent, alumina between about 30 and 40 weight percent, and boria between about 5 and 15 weight percent.

8. The presintering mixture as in claim 1 wherein the glassy component comprises a vitreous composition formed from a mixture of about 50 weight percent calcia, about 40 weight percent alumina, and about 10 weight percent boria.

9. The presintering mixture as in claim 1 wherein the sintering aid is present in the presintering mixture in a particle size of about 3 to about 5 microns.

10. The presintering mixture as in claim 1 wherein said Group IIa metals are selected from the group consisting of Ca, Sr, Ba and mixtures thereof.

11. The presintering mixture as in claim 1 wherein said Group IIIa and lanthanide metals are selected from the group consisting of Y, La, Ce, Nd, Sm, Eu, Gd, Tb, Dy, Ho, Er, Tm, Yb, Lu, and mixtures thereof.

12. The presintering mixture of claim 1 wherein said compounds are selected from the group consisting of oxides, carbonates, nitrates, sulfates, fluorides and mixtures thereof.

13. The presintering mixture of claim 1 wherein the weight ratio of a):b) is about 1:1 to about 3.5:1.

14. The presintering mixture of claim 1 wherein the weight ratio of a):b) is about 2:1 to about 3:1.

15. The presintering mixture of claim 1 wherein the presintering mixture additionally comprises added alumina as metal oxide.

16. A shaped aluminum nitride green body comprising the presintering mixture of claim 1.

17. The shaped green body as in claim 16 comprising a laminate of at least one ceramic and at least one metal layer.

18. The shaped green body as in claim 17 wherein said metal comprises at least one of tungsten and molybdenum.

19. A low temperature process for producing sintered aluminum nitride bodies comprising
   ramping the temperature of a presintering mixture as set forth in claim 1 in a sintering atmosphere to a sintering temperature between about 1550° C. to about 1700° C.,
   maintaining boria vapor in the sintering atmosphere at temperatures greater than about 1200° C.,
   forming a liquid at a temperature of about 1500° C. containing said metal element or compound and said glassy component,
   providing a partial pressure of the liquid in the sintering atmosphere at temperatures greater than about 1500° C., and
   holding said sintering temperature for an effective period of time to achieve aluminum nitride density of greater than about 95% of theoretical and thermal conductivity greater than about 120 W/m-K.

20. The process as in claim 19 wherein the sintering temperature is held between about 1550° C. to about 1650° C.

21. The process as in claim 19 wherein the sintering temperature is held between about 1550° C. to about 1600° C.

22. A sintered aluminum nitride body having a density of greater than about 95% of theoretical and a thermal conductivity greater than about 120 W/m-K prepared by the process of claim 19.

23. A co-sintered multilayer laminate comprising at least one ceramic layer and at least one metal layer wherein the at least one ceramic layer comprises the sintered aluminum nitride body as in claim 22.

24. The co-sintered multilayer laminate as in claim 23 wherein said metal comprises at least one of tungsten and molybdenum.

25. A multilayer metal-ceramic electronic package containing the sintered aluminum nitride body as in claim 22.

26. A presintering aluminum nitride powder/sintering aid mixture wherein the aluminum nitride contains impurity alumina and wherein the sintering aid comprises a glassy component formed from a) an oxide of at least one metal selected from the group consisting of Group IIIa, lanthanide metals and mixtures thereof, and b) alumina, calcia, and boria.

27. The presintering mixture as in claim 26 wherein the glassy component is a glass having the constituent elements Ca-Al-B-Y-O.

28. The presintering mixture as in claim 27 wherein the glassy component is a glass formed by rapid quenching a melt of calcia, alumina, boria and yttria.

29. The presintering mixture as in claim 26 wherein the glassy component comprises a vitreous composition formed from a mixture of about 10 to greater than 20 weight percent yttria, about 5 to about 10 weight percent boria, and the remainder calcia and alumina in a weight ratio of about 40–60 calcia to about 60–40 alumina.

30. The presintering mixture as in claim 26 wherein the glassy component comprises a vitreous composition formed from a mixture of about 40 weight percent calcia, about 30–40 weight percent alumina, about 10–20 weight percent yttria and about 10 weight percent boria.

31. The presintering mixture as in claim 26 wherein the sintering aid is present in the presintering mixture in a particle size of about 3 to about 5 microns.

32. The presintering mixture as in claim 26 wherein the sintering aid contains an additional non-vitreous component comprising at least one element or compound of a metal selected from the group consisting of Group IIa, IIIa, lanthanide metals and mixtures thereof.

33. The presintering mixture as in claim 32 wherein said Group IIa metals are selected from the group consisting of Ca, Sr, Ba and mixtures thereof, and wherein said Group IIIa and lanthanide metals are selected from the group consisting of Y, La, Ce, Nd, Sm, Eu, Gd, Tb, Dy, Ho, Er, Tm, Yb, Lu, and mixtures thereof.

34. The presintering mixture of claim 32 wherein said compound is selected from the group consisting of oxides, carbonates, nitrates, sulfates, fluorides and mixtures thereof.

35. The presintering mixture of claim 32 wherein the weight ratio of the additional component to the glassy component is about 1:1 to about 3.5:1.

36. The presintering mixture of claim 32 wherein the weight ratio of the additional component to the glassy component is about 2:1 to about 3:1.

37. The presintering mixture of claim 32 wherein the presintering mixture additionally comprises added alumina as metal oxide.

38. A shaped aluminum nitride green body comprising the presintering mixture of claim 32.

39. The shaped green body as in claim 38 comprising a laminate of at least one ceramic and at least one metal layer.

40. The shaped green body as in claim 39 wherein said metal comprises at least one of tungsten and molybdenum.

41. A low temperature process for producing sintered aluminum nitride bodies comprising ramping the temperature of a presintering mixture as set forth in claim 32 in a sintering atmosphere to a sintering temperature between about 1550° C. to about 1700° C., maintaining boria vapor in the sintering atomsphere at temperatures greater than about 1200° C., forming a liquid at a temperature of about 1500° C. containing said at least one element or compound and said glassy component, providing a partial pressure of the liquid in the sintering atmosphere at temperatures greater than about 1500° C., and holding said sintering temperature for an effective period of time to achieve aluminum nitride density of greater than about 95% of theoretical and thermal conductivity greater than about 120 W/m-K.

42. The process as in claim 41 wherein the sintering temperature is held between about 1550° C. to about 1650° C.

43. A sintered aluminum nitride body having a density of greater than about 95% of theoretical and a thermal conductivity greater than about 120 W/m-K prepared by the process of claim 42.

44. A co-sintered multilayer laminate comprising at least one ceramic layer and at least one metal layer wherein the at least one ceramic layer comprises the sintered aluminum nitride body as in claim 43.

45. The co-sintered multilayer laminate as in claim 44 wherein said metal comprises at least one of tungsten and molybdenum.

46. A multilayer metal-ceramic electronic package containing the sintered aluminum nitride body as in claim 43.

47. The presintering mixture as in claim 26 wherein said Group IIIa and lanthanide metals are selected from the group consisting of Y, La, Ce, Nd, Sm, Eu, Gd, Tb, Dy, Ho, Er, Tm, Yb, Lu, and mixtures thereof.

48. The presintering mixture of claim 26 wherein the presintering mixture additionally comprises added alumina as metal oxide.

49. A shaped aluminum nitride green body comprising the presintering mixture of claim 26.

50. The shaped green body as in claim 49 comprising a laminate of at least one ceramic and at least one metal layer.

51. The shaped green body as in claim 50 wherein said metal comprises at least one of tungsten and molybdenum.

52. A low temperature process for producing sintered aluminum nitride bodies comprising ramping the temperature of a presintering mixture as set forth in claim 26 in a sintering atmosphere to a sintering temperature between about 1550° C. to about 1700° C., maintaining boria vapor in the sintering atmosphere at temperatures greater than about 1200° C., forming a liquid at a temperature of about 1500° C. containing said glassy component, providing a partial pressure of the liquid in the sintering atmosphere at temperatures greater than about 1500° C., and holding said sintering temperature for an effective period of time to achieve aluminum nitride density of greater than about 95% of theoretical and thermal conductivity greater than about 120 W/m-K.

53. The process as in claim 52 wherein the sintering temperature is held between about 1550° C. to about 1650° C.

54. A sintered aluminum nitride body having a density of greater than about 95% of theoretical and a thermal conductivity greater than about 120 W/m-K prepared by the process of claim 53.

55. A co-sintered multilayer laminate comprising at least one ceramic layer and at least one metal layer wherein the at least one ceramic layer comprises the sintered aluminum nitride body as in claim 54.

56. The co-sintered multilayer laminate as in claim 55 wherein said metal comprises at least one of tungsten and molybdenum.

57. A multilayer metal-ceramic electronic package containing the sintered aluminum nitride body as in claim 54.

58. A sintered aluminum nitride body having low camber, high dimensional stability, at least 95% theoretical density and a thermal conductivity of at least 120 W/m-K comprising aluminum nitride and a second phase containing a ternary metal oxide $CaYAl_3O_7$ having substitutional boron contained within the second phase ternary metal oxide.

59. The sintered aluminum nitride body as in claim 58 wherein said second phase contains $YAlO_3$.

60. The sintered aluminum nitride body as in claim 58 wherein said second phase contains at least one calcia borate.

61. A multilayer metal ceramic electronic package containing the sintered aluminum nitride body as in claim 58.

62. The process as in claim 19 wherein the sintering atmosphere contains nitrogen.

63. The process as in claim 62, wherein the sintering atmosphere contains nitrogen and hydrogen.

64. The process as in claim 46 wherein the sintering atmosphere contains nitrogen.

65. The process as in claim 64 wherein the sintering atmosphere contains nitrogen and hydrogen.

66. The process as in claim 52 wherein the sintering atmosphere contains nitrogen.

67. The process as in claim 66 wherein the sintering atmosphere contains nitrogen and hydrogen.

* * * * *